(12) United States Patent
Chino (10) Patent No.: US 11,378,774 B2
(45) Date of Patent: Jul. 5, 2022

(54) LENS CONTROL APPARATUS, IMAGING APPARATUS INCLUDING LENS CONTROL APPARATUS, AND LENS CONTROL METHOD

(71) Applicant: CANON KABUSHIKI KAISHA, Tokyo (JP)

(72) Inventor: Shunsuke Chino, Wako (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/169,406

(22) Filed: Oct. 24, 2018

(65) Prior Publication Data

US 2019/0129134 A1  May 2, 2019

(30) Foreign Application Priority Data

Oct. 31, 2017 (JP) .............................. JP2017-211221

(51) Int. Cl.
  *G02B 7/10* (2021.01)
  *G02B 7/28* (2021.01)
  (Continued)

(52) U.S. Cl.
  CPC .............. *G02B 7/102* (2013.01); *G02B 7/282* (2013.01); *G02B 7/36* (2013.01); *G03B 3/10* (2013.01);
  (Continued)

(58) Field of Classification Search
  CPC ........ G02B 7/102; G02B 7/08; G02B 13/009; G02B 7/10; G02B 15/14; G02B 27/646;
  (Continued)

(56) References Cited

U.S. PATENT DOCUMENTS 5,196,879 A  *  3/1993  Hata ...................... G02B 7/102
                                                    396/82
5,231,441 A  *  7/1993  Hata ...................... G02B 7/102
                                                    396/82
(Continued)

FOREIGN PATENT DOCUMENTS

CN         101782679 A      7/2010
CN         103837970 A      6/2014
(Continued)

*Primary Examiner* — William R Alexander
*Assistant Examiner* — Sharrief I Broome
(74) *Attorney, Agent, or Firm* — Canon U.S.A., Inc. IP Division (57) ABSTRACT

A lens control apparatus includes a control unit that controls a position of a zoom lens and a position of a focus lens, a storage unit that stores cam tracks, an object distance acquisition unit that acquires an object distance, and a target position acquisition unit that acquires information of a first track corresponding to the object distance acquired by the object distance acquisition unit before movement of the zoom lens and a second track corresponding to an object distance longer than that of the first track, and the target position of the focus lens so as to move a focal position of an imaging optical system including the zoom lens and the focus lens based on the first track and the second track when zoom magnification of the imaging optical system including the zoom lens and the focus lens is increased by the movement of the zoom lens.

17 Claims, 8 Drawing Sheets

(51) Int. Cl.
*G03B 3/10* (2021.01)
*G02B 7/36* (2021.01)
*G03B 13/36* (2021.01)
*G03B 5/00* (2021.01)
*H04N 5/232* (2006.01)

(52) U.S. Cl.
CPC ............... *G03B 5/00* (2013.01); *G03B 13/36* (2013.01); *H04N 5/23212* (2013.01); *H04N 5/23218* (2018.08); *H04N 5/23296* (2013.01); *G03B 2205/0046* (2013.01); *G03B 2205/0053* (2013.01)

(58) Field of Classification Search
CPC ...... G02B 7/09; G02B 13/0065; G02B 15/16; G02B 7/021; G02B 7/04; G02B 15/173; G02B 15/177; G02B 7/022; G02B 13/0075; G02B 23/2438; G02B 26/0875; G02B 3/14; G02B 7/005; G02B 7/023; H04N 5/23296; H04N 5/2254; H04N 5/23203; H04N 5/23212; H04N 5/2251; H04N 5/2252; H04N 5/23209; H04N 5/23287; H04N 2101/00; H04N 5/225; H04N 5/2253; H04N 5/2257; H04N 5/23216; H04N 5/23258; H04N 2201/0084; H04N 5/2256; H04N 5/232; H04N 5/23238; H04N 5/2328; H04N 5/23293; G03B 3/10; G03B 5/00; G03B 2205/0046; G03B 17/04; G03B 17/14; G03B 2205/0053; G03B 13/34; G03B 13/36; G03B 17/12; G03B 2205/0007; G03B 2205/0061; G03B 2205/0069; G03B 29/00; G03B 5/02; G03B 13/32; G03B 17/56; G03B 17/565; G03B 21/142; G03B 21/53; G03B 2205/00

See application file for complete search history.

(56) References Cited

U.S. PATENT DOCUMENTS

| | | | |
|---|---|---|---|
| 2009/0009651 A1* | 1/2009 | Takayanagi | G03B 13/36 348/345 |
| 2010/0178045 A1* | 7/2010 | Hongu | G02B 7/282 396/80 |
| 2014/0139930 A1* | 5/2014 | Takahashi | G02B 15/142 359/680 |
| 2015/0163413 A1* | 6/2015 | Ikeda | H04N 5/23219 348/240.99 |

FOREIGN PATENT DOCUMENTS

| | | |
|---|---|---|
| JP | 5-45575 A | 2/1993 |
| JP | 2008-026801 A | 2/2008 |
| JP | 2012-13838 A | 1/2012 |

* cited by examiner

LENS CONTROL APPARATUS, IMAGING APPARATUS INCLUDING LENS CONTROL APPARATUS, AND LENS CONTROL METHOD

BACKGROUND OF THE INVENTION

Field of the Invention

The present invention relates to a control apparatus that controls a position of a focus lens and a position of a zoom lens, an imaging apparatus including the lens control apparatus, and a lens control method.

Description of the Related Art

To maintain an in-focus state during zooming operation, there has been known a technique for performing autofocusing (AF) using an evaluation value that indicates contrast of a high-frequency component of an image during zooming to control a position of a focus lens (hereinafter, AF during zooming). In the AF during zooming, focusing is performed based on the evaluation value while a focal position is actually being moved. Accordingly, the in-focus position may become unstable at low illuminance or depending on an object, or defocusing may occur in a case where the object is not located at a center of an imaging range.

Japanese Patent Application Laid-Open No. H5-45575 discusses a technique for improving focus stability during zooming by performing control to focus on a distance of a specific object within a predetermined focal length in a case where a sufficient depth of field is secured and performing the AF during zooming in other cases.

By the technique discussed in Japanese Patent Application Laid-Open No. H5-45575, however, the in-focus state may become unstable or an out-of-focus state may be caused in a case where a sufficient depth of field is not secured due to, for example, a long focal length.

SUMMARY OF THE INVENTION

According to an aspect of the present invention, a lens control apparatus includes a control unit configured to control a position of a zoom lens and a position of a focus lens, a storage unit configured to store a plurality of tracks indicating a relationship between a position of the zoom lens and a position of the focus lens when each of a plurality of object distances is in focus, an object distance acquisition unit configured to acquire an object distance, a target position acquisition unit configured to acquire a target position of the focus lens. The control unit is configured to control the position of the focus lens to the target position. The target position acquisition unit is configured to acquire information of a first track corresponding to the object distance acquired by the object distance acquisition unit before movement of the zoom lens and a second track corresponding to an object distance longer than the object distance of the first track, and the target position of the focus lens so as to move a focal position of an imaging optical system including the zoom lens and the focus lens based on the first track and the second track in a case where zoom magnification of the imaging optical system including the zoom lens and the focus lens is increased by the movement of the zoom lens.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

An outline of exemplary embodiments according to the present invention will now be described. A lens control apparatus according to each of the exemplary embodiments includes a control unit configured to control a position of a zoom lens and a position of a focus lens that constitute an imaging optical system, and an acquisition unit configured to acquire a target position of the focus lens. The control unit controls the position of the focus lens to the target position acquired by the acquisition unit. The acquisition unit acquires the target position of the focus lens so as to move a focal position based on movement of the zoom lens. The focal position refers to an in-focus position. If an object is present at the focal position, the object is in focus. In other words, if the zoom lens is moved in the lens control apparatus according to the exemplary embodiments, the focal position is also moved. More specifically, if a zoom magnification is increased (zoom-in operation is performed) according to a change of the position of the zoom lens, the focal position is moved toward an infinite distance side. This is based on an assumption that an instruction of the zoom-in operation is highly likely to be performed due to an increase of a distance to the object when the object itself is moved or an object is changed. In a case of an inner focus zoom lens, if the zoom lens is moved while the focus lens is fixed, the focal position is moved due to a change of an image plane position. The lens control apparatus according to the exemplary embodiments acquires the target position of the focus lens so as to move the focal position in an appropriate direction taking into account a change amount of the image plane position associated with the movement of the zoom lens.

The exemplary embodiments of the present invention are described in detail below with reference to the accompanying drawings. In the drawings, the same members are denoted by the same reference numerals, and redundant descriptions thereof are omitted.

In a first exemplary embodiment, an imaging apparatus including a lens control apparatus that moves the focal position based on a moving amount and a moving direction of the zoom lens is described. The imaging apparatus of this exemplary embodiment is described assuming a network camera that can display a captured image, operate the imaging apparatus, etc. at a remote place.

Figure 1:
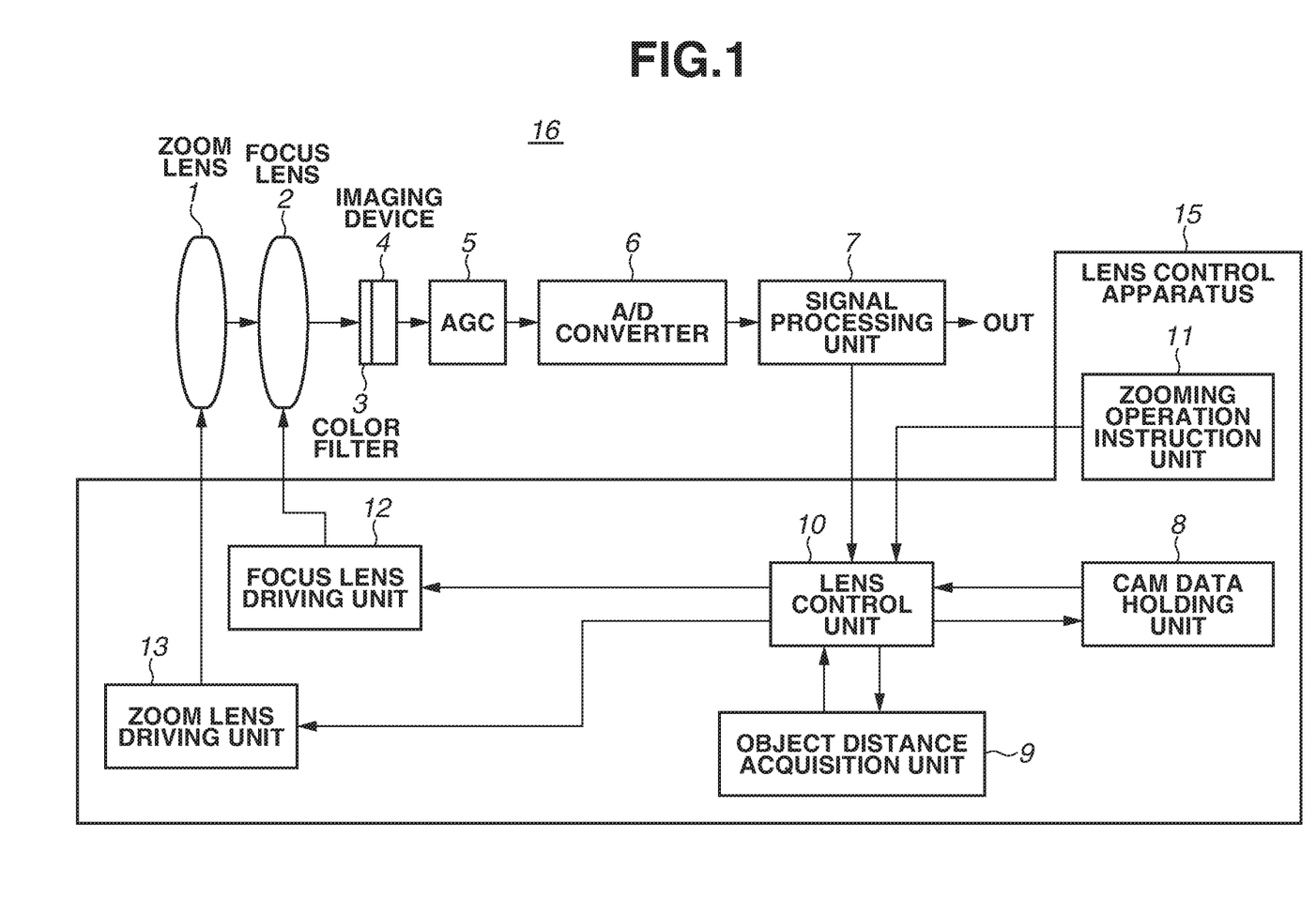
FIG. 1 is a configuration diagram illustrating an imaging apparatus according to a first exemplary embodiment.

FIG. 1 is a block diagram illustrating an example configuration of an imaging apparatus 16 according to the present exemplary embodiment.

The imaging apparatus 16 includes an imaging optical system, an imaging device 4, an automatic gain controller (hereinafter, AGC) 5, an analog-to-digital (A/D) converter 6, and a signal processing unit 7. The imaging device 4 photoelectrically converts light from the imaging optical system into an image signal and outputs the image signal. The AGC 5 processes the image signal from the imaging device 4. A lens control apparatus 15, which is included in the imaging apparatus 16, includes a cam data holding unit (storage unit) 8 that holds information (hereinafter, cam data) that includes a plurality of tracks (hereinafter, cam tracks) each indicating a positional relationship between the zoom lens and the focus lens when a specific object distance is in focus. The lens control apparatus 15 further includes a lens control unit 10 that controls the position of the focus lens and the position of the zoom lens, and a focus lens driving unit 12 and a zoom lens driving unit 13 that drive the focus lens and the zoom lens, respectively, according to instructions from the lens control unit 10. The lens control apparatus 15 further includes an object distance acquisition unit 9 that acquires the object distance based on the cam data, the position of the focus lens, and the position of the zoom lens, and a zooming operation instruction unit 11 that receives a zooming operation instruction. Configurations of the units are described below.

The light entering the imaging device 4 through the imaging optical system that includes a zoom lens 1, a focus lens 2, and a color filter 3 is photoelectrically converted into the image signal by the imaging device 4 that includes a charge-coupled device (CCD) sensor, a complementary metal-oxide semiconductor (CMOS) sensor, or the like. The image signal is output to the AGC 5. The AGC 5 adjusts a gain for the image signal, and outputs the gain-adjusted image signal to the A/D converter 6. The A/D converter 6 performs A/D conversion on the gain-adjusted image signal, and outputs the A/D-converted image signal to the signal processing unit 7.

The signal processing unit 7 performs image processing on the image signal, and outputs the image signal subjected to the image processing to outside. The output image signal is transmitted to, for example, a computer with a viewer located at a remote place through a network, and an image based on the image signal is displayed on a display connected to the computer. The signal processing unit 7 also functions as a focus detection unit together with the lens control unit 10, and calculates an autofocus (hereinafter, AF) evaluation value used for autofocusing by a contrast detection method. The signal processing unit 7 according to the present exemplary embodiment calculates the AF evaluation value with use of high-frequency components of the image signal input to the signal processing unit 7.

Figure 2:
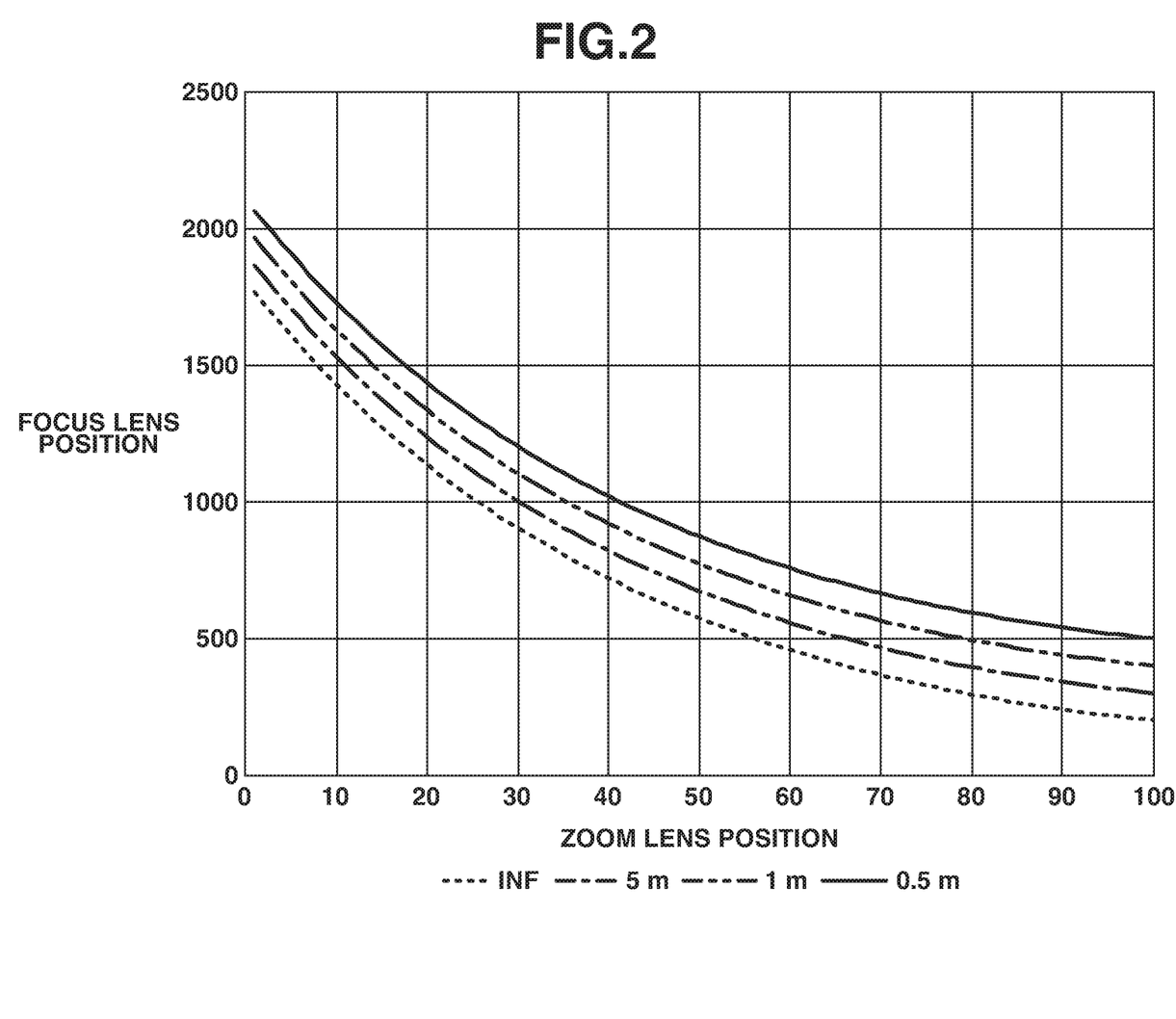
FIG. 2 is a graph illustrating an example of cam data according to the first exemplary embodiment.

The cam data holding unit 8 includes any of various kinds of storage units such as a random access memory (RAM), and holds the cam data indicating a relationship between the position of the zoom lens 1 and the position of the focus lens 2 when each of a plurality of object distances is in focus. FIG. 2 illustrates an example graph of the cam data held by the cam data holding unit 8, and the graph is based on a table in which the position of the focus lens 2 is determined so that the specific object distance is in focus relative to the position of the zoom lens 1. A horizontal axis indicates the position of the zoom lens, and a vertical axis indicates the position of the focus lens. A track is determined for each distance to the object (hereinafter, object distance) starting from the position of the lens, which constitutes the imaging optical system, when located on the closest side to the infinite position. In the vertical axis, the larger value indicates a closer distance side, and the smaller value indicates an infinite distance side. In the horizontal axis, the larger value indicates a telephoto side, and the smaller value indicates a wide-angle side. To perform zooming while focusing on the object located at 1 m, the position of the zoom lens and the position of the focus lens are controlled so as to follow the illustrated track of 1 m. The cam data includes a plurality of cam tracks, and the cam tracks are set so as to divide a length from an infinite end (INF) to a closest end (0.5 m) by the number of cam tracks. The number of cam tracks is appropriately set depending on following accuracy for the object distance, the lenses, and a sensor pitch. In the present specification, the positional relationship between the focus lens and the zoom lens in which one object distance is in focus is referred to as the cam track, and data including the plurality of cam tracks is referred to as the cam data.

The object distance acquisition unit 9 receives the focus lens position and the zoom lens position that are acquired from the lens control unit 10, and at least a part of the cam data acquired from the cam data holding unit 8, thereby acquiring the object distance. More specifically, the object distance acquisition unit 9 acquires, as the object distance, a distance to the focal position acquired with reference to the cam data based on the focus lens position and the zoom lens position on an assumption that the object is in focus. The acquired object distance is output to the lens control unit 10.

The lens control unit 10 performs various kinds of processing in order to control the position of the zoom lens 1 and the position of the focus lens 2. During the AF, the lens control unit 10 performs control to move the focus lens 2 by a predetermined amount, and detects, as an in-focus position, a lens position at which the AF evaluation value, which is calculated by the signal processing unit 7 based on the image signals acquired at respective positions, is at a peak. The in-focus position indicates a position of the lens at which the object is in focus, and is different from the focal position. During the zooming operation, the lens control unit 10 controls the zoom lens position so as to move the zoom lens according to the zooming operation instruction from the zooming operation instruction unit 11. In addition, the lens control unit 10 also functions as an acquisition unit that acquires the target position of the focus lens so as to move the focal position based on the movement of the zoom lens. The lens control unit 10 also functions as a control unit that controls the focus lens to the target position by acquiring the moving amount for moving the focus lens to the target position and instructing the moving amount to the driving unit. The method for acquiring the target position of the focus lens is described below.

The zooming operation instruction unit 11 receives an instruction of the zooming operation from a viewer or a zoom bar of the camera, and outputs the instruction to the lens control unit 10. As the instruction of the zooming operation, zoom magnification after zooming or information corresponding thereto (e.g., focal length and field angle)

may be given, or only a zoom direction may be given. The former is, for example, an instruction such as zoom magnification ratio of five times. When receiving the instruction, the lens control unit 10 controls the position of the zoom lens so as to move the zoom lens until the zoom magnification ratio becomes five times. Meanwhile, the latter is, for example, an instruction such as to move the zoom lens toward the telephoto side while a zoom-in button is pressed.

Each of the focus lens driving unit 12 and the zoom lens driving unit 13 includes any kind of actuator, and drives each of the focus lens 2 and the zoom lens 1 based on a control signal from the lens control unit 10.

Each of the signal processing unit 7, the object distance acquisition unit 9, the lens control unit 10, and the zooming operation instruction unit 11 is configured by any kind of processor, such as a central processing unit (CPU), reading a program for achieving the above-described processing from a storage unit (not illustrated) that stores the program and executing the program.

Figure 3A:
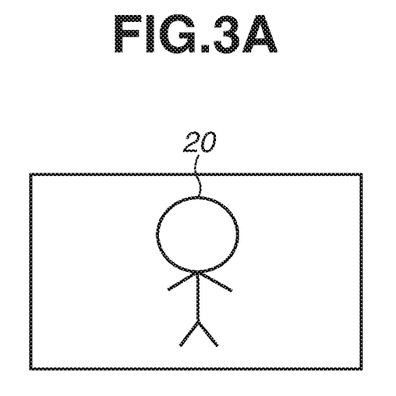
FIG. 3A is a diagram illustrating a relationship between a field angle and a focal position according to the first exemplary embodiment.
Figure 3B:
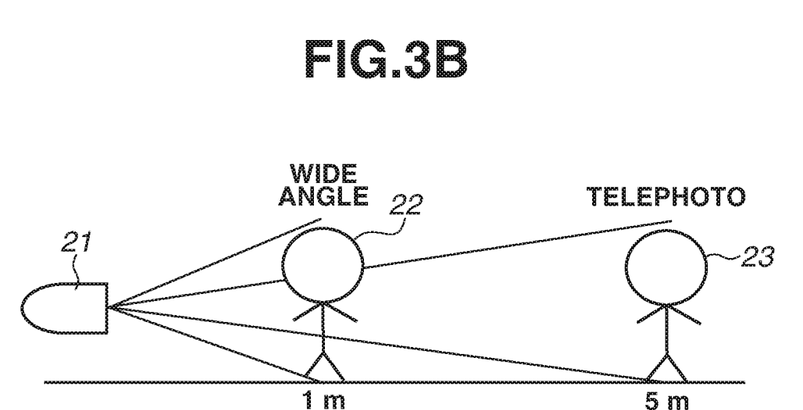
FIG. 3B is a diagram illustrating the relationship between the field angle and the focal position according to the first exemplary embodiment.

Next, processing for controlling the focus lens position during the zooming operation is described. Use cases of the network camera include imaging at a specific pan/tilt position or a zoom position such as a preset position and detection of a specific object. To detect a person as the specific object, the number of pixels greater than or equal to a predetermined number is necessary for a face and the whole of the person, and it is necessary to image a person 20 in a specific size as illustrated in FIG. 3A. There is a correlation between the imaging field angle and the object distance as illustrated in FIG. 3B, and a distance (5 m) between an imaging apparatus 21 and a person 23 when the imaging field angle is on the telephoto side is longer than a distance (1 m) between the imaging apparatus 21 and a person 22 when the imaging field angle is on the wide-angle side. Accordingly, focus is preferably controlled to be on the object distance so that the sizes of the objects are substantially equal with one another.

Figure 4:
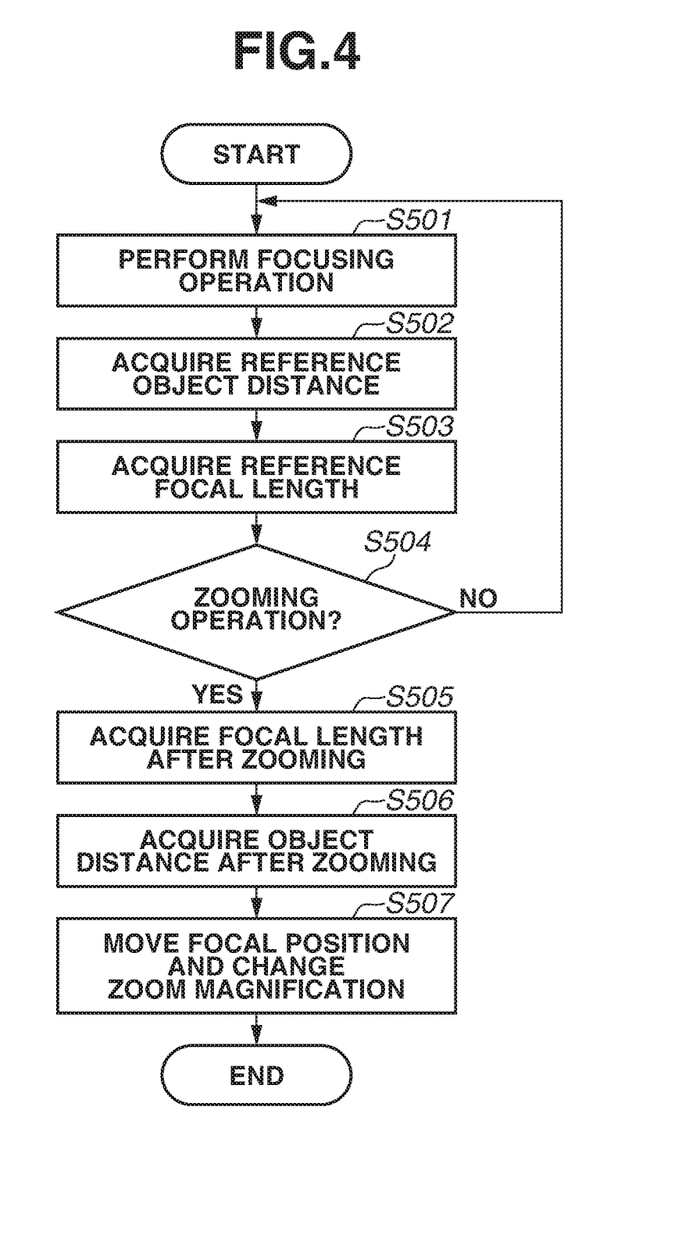
FIG. 4 is a flowchart of lens control according to the first exemplary embodiment.

The focus control during the zooming operation is described with reference to a flowchart of FIG. 4. First, in step S501, a focus adjustment is performed by an AF operation or a focusing operation by a user so as to focus on an object to be imaged. In a case where the focus adjustment is performed by the AF operation, the target position of the focus lens is acquired based on a result of focus detection by the contrast AF method, and the focus lens is controlled to move to the target position, whereby the focus adjustment is performed. The contrast AF method is a known technology, and a description thereof is omitted herein. In place of the contrast AF method, an imaging plane phase difference AF method by which parallax image signals are acquired from an imaging device to perform phase difference focus detection may also be used.

In step S502, a reference object distance is acquired. The reference object distance refers to an object distance before the zoom position is moved. As described above, the object distance is acquired with reference to the cam data based on the focus lens position and the zoom lens position on the assumption that the object is in focus. For example, in a case where the zoom lens is located at a position 80 and the focus lens is located at a position 500 in FIG. 2, the object distance is 1 m. Since the cam data holding unit 8 holds the positional relationship between the zoom lens and the focus lens for limited object distances, the object distance is calculated by interpolation as necessary. For example, in a case where the zoom lens is located at a position 90 and the focus lens is located at the position 500, the object distance is a value between 0.5 m and 1 m and is accordingly calculated by interpolation.

Next, in step S503, a reference focal length is acquired. The reference focal length refers to a focal length before the zoom position is moved. The focal length is calculated from the position of the zoom lens 1 and the position of the focus lens 2 by a known method. The focal length may also be acquired by storing a table indicating a relationship between the lens position and the focal length in a storage unit and by referring to the table.

Next, in step S504, it is determined whether the zooming operation has been instructed by the zooming operation instruction unit 11. In a case where the zooming operation has been instructed (Yes in step S504), the processing proceeds to step S505. In a case where the zooming operation has not been instructed (No in step S504), the processing returns to step S501, and the lens control unit 10 waits until an instruction of the zooming operation is given while repeating steps S501 to S504.

In step S505, a focal length after a predetermined time elapses (hereinafter, a focal length after zooming) is acquired. The focal length after zooming is acquired based on the current focal length, and a driving speed and a driving direction of the zoom lens. The predetermined time refers to a cycle of performing a position control of the zoom lens, and is set on a driving cycle V of a video image, a frame rate of network distribution, etc. After the focal length after zooming is acquired, the processing proceeds to step S506.

In step S506, an object distance after the predetermined time elapses (hereinafter, an object distance after zooming) is estimated based on the focal length after zooming acquired in step S505, the reference object distance acquired in step S502, and the reference focal length acquired in step S503. An example of an equation for the object distance after zooming is described below:

$$Dpost = Dpre \times Fpost/Fpre \quad (1),$$

where Dpre represents the reference object distance, Dpost represents the object distance after zooming, Fpre represents the reference focal length, and Fpost represents the focal length after zooming.

Equation (1) is based on an assumption that the size of the object in the image signal (size of the object within an imaging range) is the same before and after movement of the zoom lens, i.e., the size of the object in the image signal is kept constant due to the movement of the zoom lens. Based on the assumption, in Equation (1), the object distance before the zooming operation is multiplied by a ratio of the focal lengths before and after the zooming operation to calculate the object distance after the zooming operation. Depending on a depth of focus, deviation of about 30% for the size of the object in the image signal is often tolerable. Accordingly, in the present invention and the present specification, the constant size of the object in the image signal tolerates an error of about 30%. In a case where the depth of focus is shallow or in order to improve accuracy, the error may be confined to about 20%. The object distance may be calculated by reflecting the error on the equation. In Equation (1), the calculation is performed with use of the focal length. Alternatively, the object length after zooming may be calculated based on a field angle with use of a trigonometric function. Various modifications and alternations may be made in the equation.

In step S507, the focal position is moved. In the present exemplary embodiment, a cam track corresponding to the object distance after zooming is selected from the cam data, and the focus lens position corresponding to the zoom lens position is acquired as the target position of the focus lens. Then, the focus lens is moved so that the target position and the focus lens position are coincident with each other after the predetermined time elapses. As a result, the focal position is moved based on the movement of the zoom lens by the zooming operation. As described above, in the present exemplary embodiment, the focus lens position is controlled so that the focal position after the predetermined time elapses is coincident with the acquired object distance after zooming. The focal position is moved to the infinite distance side in the zoom-in operation and to the closest distance side in the zoom-out operation to achieve an effect of reducing a focal position deviation.

In a case where the AF is cyclically performed as in a case of imaging a moving image in the AF mode, slight defocus often occurs during zooming, and an operation for focusing is performed by the AF after zooming. Performing the control according to the present exemplary embodiment achieves an effect of maintaining an in-focus state during zooming, an effect of reducing a time necessary for achieving the in-focus state in the AF after zooming, and an effect of preventing focusing stop in a defocused state.

In the present exemplary embodiment, the predetermined time in acquiring the focal length after zooming and the object distance after zooming is the cycle of performing the position control of the zoom lens. In a case where the zooming operation instruction is an instruction of the zoom magnification after zooming operation, however, the predetermined time may also be a time necessary for performing the zooming operation to reach the instructed zoom magnification. As the predetermined time becomes longer, a possibility of occurrence of the focal position deviation during zooming becomes higher; however, the focal position is moved to the same position as the position in the present exemplary embodiment at the end of the zooming operation. Thus, the effect of reducing the time necessary for achieving the in-focus state in the AF after zooming and the effect of preventing focusing stop in a defocused state are expected.

In a second exemplary embodiment, an imaging apparatus including a lens control apparatus that moves the focal position based on the moving amount and the moving direction of the zoom lens is described as with the first exemplary embodiment. The lens control apparatus according to the present exemplary embodiment is different from that according to the first exemplary embodiment in that the object distance after zooming is acquired without using the reference focal length and the reference object distance. A configuration of the imaging apparatus according to the present exemplary embodiment is similar to that of the imaging apparatus according to the first exemplary embodiment, and a description thereof is omitted. In the present exemplary embodiment, however, the signal processing unit 7 also functions as an object detection unit that detects an object based on the image signal.

In a case where the object to be imaged (main object) is determined, the object distance can be acquired from the size of the main object and the field angle. A zooming operation according to the present exemplary embodiment is described in detail with reference to the flowchart of FIG. 5.

Figure 5:
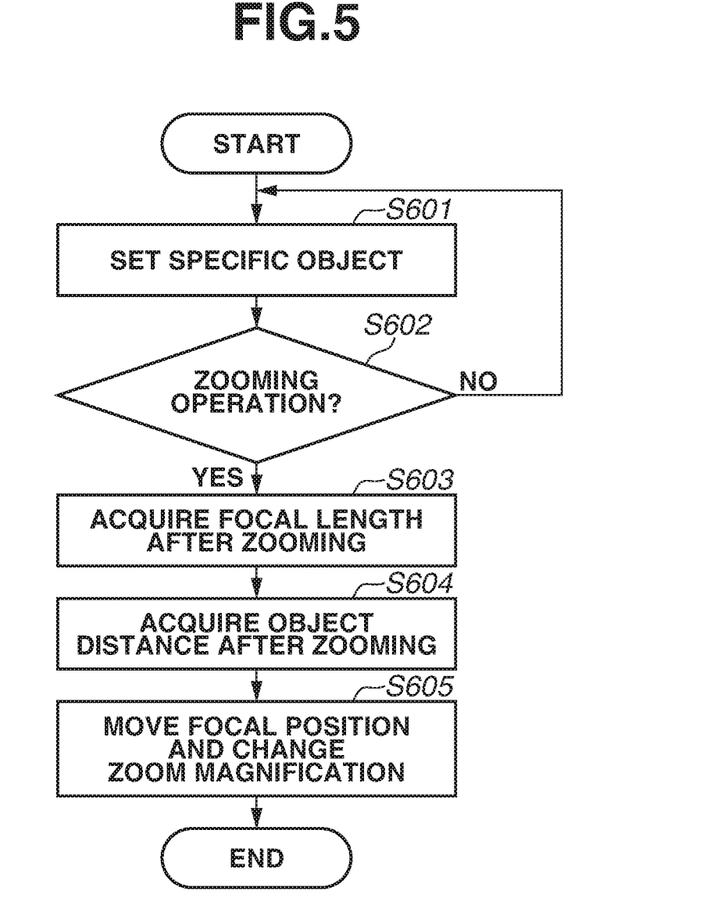
FIG. 5 is a flowchart of lens control according to a second exemplary embodiment.

First, in step S601, the main object is set. The main object may be set by the user or may be set by automatically identifying the main object based on the image signal.

In step S602, presence or absence of the zooming operation instruction is determined in a manner similar to step S504. In a case where the zooming operation has been instructed (Yes in step S602), the processing proceeds to step S603. In a case where the zooming operation has not been instructed (No in step S602), the processing returns to step S601, and the lens control unit 10 waits for the instruction.

In step S603, the focal length after zooming is acquired in a manner similar to step S505. Then, the processing proceeds to step S604. A method of acquiring the focal length after zooming is similar to the method thereof in step S505, whereby a description thereof is omitted.

In step S604, the object distance after zooming is acquired; however, an acquisition method thereof is different from the method in step S506. In this step, the object distance after zooming is calculated from the size of the main object set in step S601 and the imaging field angle that is calculated from the focal length after zooming acquired in step S603. The size of the main object is acquired from a result of the detection of the main object by the signal processing unit 7.

An example of an equation for the object distance after zooming is described below:

$$D_{obj} = \frac{H_{obj}}{2 \times \tan\left(\frac{\text{Angle}}{2}\right)}, \quad (2)$$

where $H_{obj}$ represents the size of the main object, Angle represents the imaging field angle, and $D_{obj}$ represents the specific object distance.

In a case where accuracy is different depending on the imaging apparatus and the object, the equation may be simplified according to the required accuracy, for example, by using the focal length in place of the field angle. The equation may be variously modified or alternated.

In step S605, the target position of the focus lens is acquired, and by moving the focus lens to the target position, the focal position is moved in a manner similar to step S507. As a result, the focal position is moved based on the movement of the zoom lens during the zooming operation.

In a third exemplary embodiment, estimation of the object distance after zooming operation is more simplified. A change direction of the object distance is estimated based on the moving direction of the zoom lens, and the cam track to be used in the lens control is selected based on the change direction.

A configuration according to the present exemplary embodiment is different from the configuration according to the first exemplary embodiment in that the object distance acquisition unit 9 is not provided; however, any other configuration is similar to the configuration according to the first exemplary embodiment, and a description thereof is omitted. In a case where the user recognizes the movement of the focal position when the focal position is abruptly moved during the zooming operation, the zooming operation is preferably performed by suppressing the moving amount of the focal position per unit time to a predetermined amount or less to reduce a sense of strangeness of the user. In the present exemplary embodiment, the cam track corresponding to the focal position before the zooming operation is combined with the cam track corresponding to the focal position after the zooming operation to form the cam track to be used in the zooming operation. Then, the focus lens is moved in association with the movement of the zoom lens so as to follow the combined cam track.

Figure 6:
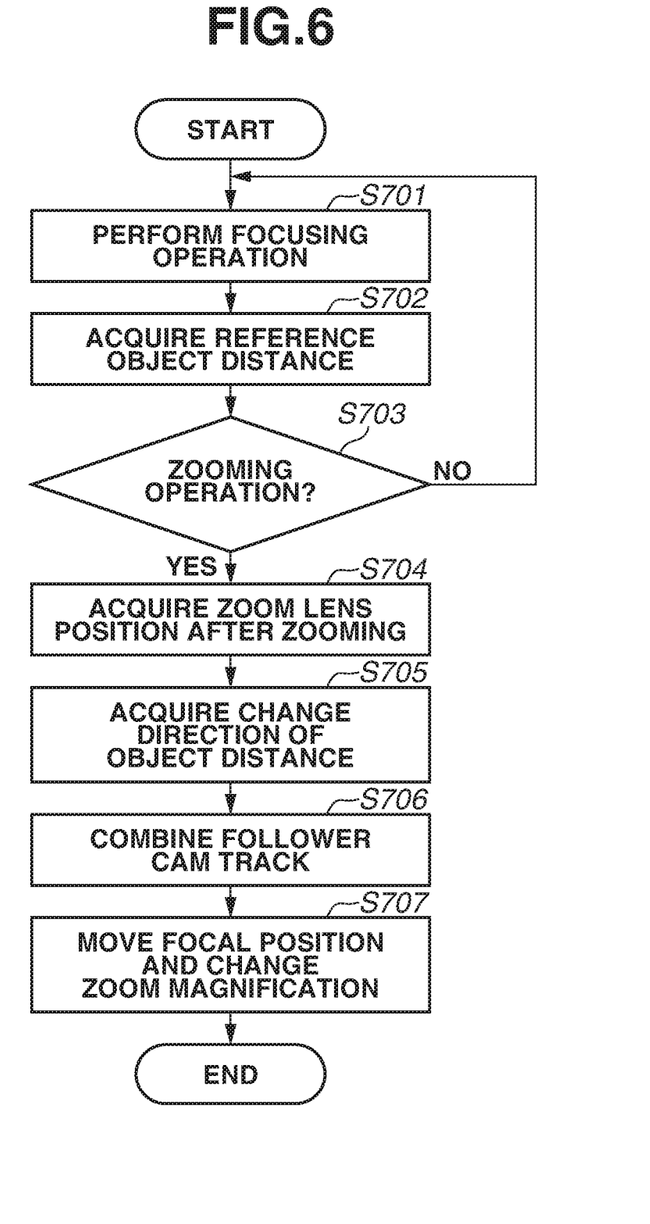
FIG. 6 is a flowchart of lens control according to a third exemplary embodiment.

An example in which the zoom magnification after the zooming operation is instructed by a user is described with reference to a flowchart of FIG. 6. Steps S701, S702, and S703 are similar to steps S501, S502, and S504, respectively, and descriptions thereof are omitted. When the zoom magnification after a change of the zoom magnification is input to the viewer by the user, the zoom magnification is input to the lens control unit 10 via the zooming operation instruction unit 11. In step S704, a zoom lens position after the change of the zoom magnification (hereinafter, a zoom lens position after zooming) is acquired based on the input zoom magnification after the change of the zoom magnification. Then, the processing proceeds to step S705. To acquire the zoom lens position based on the zoom magnification, a table may be referred, or an equation for calculating the zoom lens position based on the zoom magnification may be used.

In step S705, the change direction of the object distance is acquired. In the present exemplary embodiment, unlike step S506 in the first exemplary embodiment and step S604 in the second exemplary embodiment, the object distance after zooming is not calculated. Instead, the change direction of the object distance, i.e., whether the object distance after zooming is longer or shorter than the reference object distance, is estimated. Then, the processing proceeds to step S706.

In step S706, a following cam track to be used in the zooming operation is combined based on the reference object distance, the change direction of the object distance, the zoom lens position before the zooming operation, and the zoom lens position after zooming. The following cam track is a curve followed by the positional relationship between the focus lens and the zoom lens in step S706 described below, and is acquired by combining the cam track corresponding to the reference object distance and the cam track selected based on the change direction of the object distance. In the present exemplary embodiment, with use of the zoom lens positions before and after the zooming operation, the following cam track is combined so that the zoom lens position and the focus lens position are coincident with the cam track selected based on the change direction of the object distance at a position where the zoom lens position is coincident with the zoom lens position after zooming.

Figure 7:
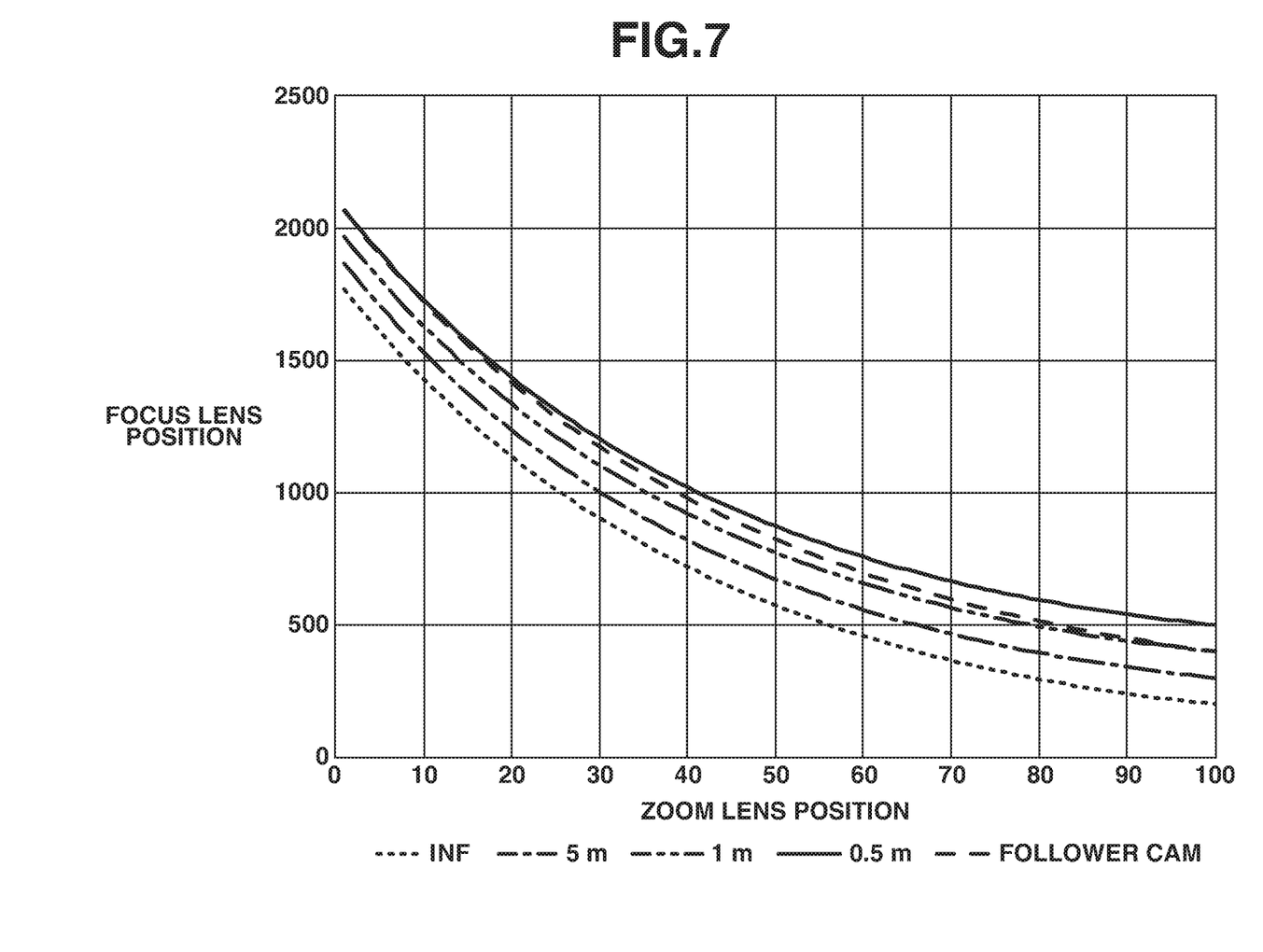
FIG. 7 is a graph illustrating an example of cam data according to the third exemplary embodiment.

An example of the following cam track according to the present exemplary embodiment is described with reference to FIG. 7. The following cam track in FIG. 7 is the following cam track in a case where an object located at 0.5 m is in focus before the zooming operation (reference object distance is 0.5 m), the zoom lens position before the zooming operation is about 0, and the lens position after zooming is 100. The positional relationship between the zoom lens and the focus lens is on the cam track for the object distance of 0.5 m near the zoom lens position 0 (wide-angle end), and is coincident with the cam track for the object distance of 1 m at the zoom lens position 100 (telephoto end). The cam track is combined so that the focal position gradually moves from the object distance of 0.5 m to 1 m by interpolation using the cam track for the object distance of 0.5 m and the cam track for the object distance of 1 m in order to substantially uniformly move the focal position while the zoom lens is moved from near the position 0 to the position 100. To uniformly move the focal position, a ratio of the moving amount of the focal position to the moving amount of zooming is kept constant, or a ratio of a field angle variation to the moving amount of the focal length by the zooming operation is kept constant. The focal position is moved toward 5 m in a case where the reference object distance is 1 m, and the focal position is moved toward INF in a case where the reference object distance is 5 m. In the present description, the focal position is moved to the infinite distance side by one cam track as a predetermined amount associated with the zooming operation; however, the focal position may be moved by two cam tracks, three cam tracks, or cam tracks of any number therebetween without being limited to one. A degree of moving the focal position may be changed according to the depth of field of the optical system or the moving speed of the zoom lens. For example, the cam track on the far object distance side may be the cam track selected based on the change direction of the object distance in the case where the depth of field is smaller than the predetermined value (shallow) rather than the case where the depth of field is greater than or equal to the predetermined value (deep). In addition, the cam track on the far object distance side may be the cam track selected based on the change direction of the object distance in the case where the moving speed of the zoom lens is smaller than the predetermined value (lower) rather than the case where the moving speed of the zoom lens is greater than or equal to the predetermined value (higher). As information relating to the moving speed, the change speed of the zoom magnification and the imaging field angle may be used. After the following cam track is combined, the processing proceeds to step S707.

In step S707, the focus lens position and the zoom lens position are controlled so that the positional relationship between the focus lens and the zoom lens (hereinafter, a lens positional relationship) follows the combined following cam track (or is located on the track). As a result, the focal position is moved, and the zoom magnification is changed.

Figure 8:
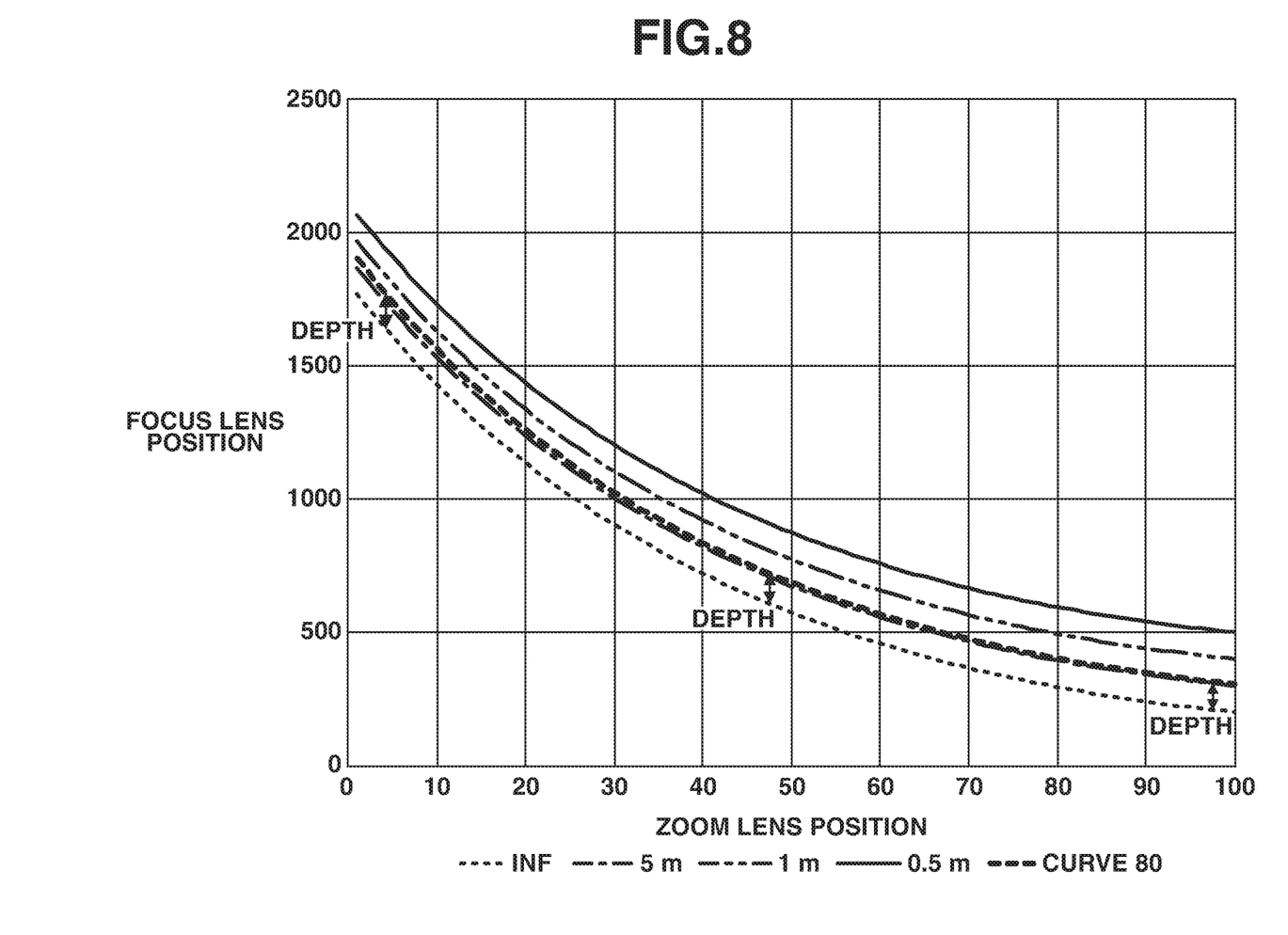
FIG. 8 is a graph illustrating an example of cam data according to a modification of the third exemplary embodiment.

In a wide-angle type lens or an imaging apparatus having a large sensor pitch, when the object distance is greater than or equal to the predetermined object distance, a state of focusing on an object at the infinite distance is established. FIG. 8 illustrates an example thereof. When the lens positional relationship is on a curve 80, the infinite distance is also within the depth of field. In other words, when the distance to the focal position is set to be greater than or equal to the object distance corresponding to the curve 80 denoted by a dashed line, the state of focusing on an object at the infinite distance is established. In the example of FIG. 8, the curve 80 is located slightly closer to the cam track for the object distance of 5 m than the cam track for the object distance of 1 m when the zoom lens is located near a position 10. Thus, when the object distance is slightly under 5 m, the state of focusing on an object at the infinite distance is established. Accordingly, in a case where the lens positional relationship becomes a positional relationship in which the infinite distance is within the depth of field by the zoom-in operation, the lens positional relationship is preferably controlled so as to cause the infinite distance to be within the depth of field and to follow the lens positional relationship in which the closest-distance side is in focus. In other words, in a case where the lens positional relationship intersects the curve 80 while moving the focal position in the farther distance direction by the zoom-in operation, the focus lens position and the zoom lens position are preferably controlled so as to follow the curve 80 after the intersection. For example, the curve 80 is stored in the cam data holding unit 8 in advance, and the focus lens position and the zoom lens position are controlled so that the lens positional relationship follows the following cam track combined in step S708 before the intersection and follows the curve 80 after the intersection. An aperture value may be used as a parameter for determining the depth of field in addition to the lens information. Accordingly, information corresponding to the curve 80 may be acquired according to the aperture value. In step S706, with use of the curve 80, the cam track corresponding to the reference object distance, and the cam track selected based on the change direction of the object distance, the following cam track may be formed by combining two cam tracks before the intersection and becoming the curve 80 after the intersection. Such control allows for a zoom-in operation while maintaining a state where the wide range is in focus.

In the present exemplary embodiment, there is described the example in which the following cam track is combined so that the lens positional relationship is coincident with the other cam track (e.g., the cam track for the object distance of 1 m) at the time when the movement of the zoom lens ends. The method for adjusting the moving amount of the focal position so as to reduce the sense of strangeness of the user, however, is not limited thereto. For example, instead of simply combining the plurality of cam tracks, the following cam may be combined so that the ratio of the moving amount of the zoom lens to the moving amount of the focal position is less than or equal to a predetermined value. In consideration of the moving speed of the zoom lens, the following cam can also be combined so that the moving amount of the focal position per unit time is less than or equal to a predetermined amount. Such a method is particularly effective in a case where only the moving direction of the zoom lens is instructed from the zooming operation instruction unit 11, for example, a case where the zoom lens is moved while the zoom button is pressed and the zoom lens is stopped when the zoom button is released.

In the present exemplary embodiment, the focal position during zooming operation is controlled with use of the cam track obtained by combining the cam track (0.5 m) corresponding to the focal position before movement of the zoom lens and the cam track (1 m) corresponding to the focal position after movement of the zoom lens. In a case where the change of the focal position during zooming is not conspicuous, for example, in a case where a depth of focus is deep or a case where a zooming time is short, however, the cam track to be used during the zooming may be switched from the cam track corresponding to the focal position before the zooming operation to the cam track corresponding to the focal position after the zooming operation.

The cam track corresponding to the combined cam track may be stored in the cam data holding unit in advance. In this case, the data amount held by the cam data holding unit is increased, but a calculation amount necessary for combining cam tracks is decreased.

In the present exemplary embodiment, the cam track to be combined is selected based on the change direction of the object distance. Alternatively, as in the first and second exemplary embodiments, the object distance after zooming may be acquired, and a cam track corresponding to the acquired object distance after zooming may be selected as the cam track to be combined.

Now, a modification common to all of the first to third exemplary embodiments is described.

Typically, the cam tracks tend to be sparse on the telephoto side compared to the wide-angle side. Accordingly, in a case where zooming is performed from the telephoto side to the wide-angle side, the zooming can be performed while an object distance focused on the telephoto side is maintained. In a case where priority is given to the method in which the zooming operation is performed while the object that has been focused on the telephoto side is still in focus, performing the movement of the focal position linked with the zooming operation as described in the present exemplary embodiment is effective only in a case where the zooming is performed from the wide-angle side to the telephoto side. To modify the first exemplary embodiment in such a manner, for example, step S504 may be replaced with a step for determining presence or absence of the zoom-in operation, and the processing may proceed to step S505 only when the zoom-in operation is instructed. To modify the second exemplary embodiment in such a manner, for example, step S602 may be replaced with a step for determining presence or absence of the zoom-in operation, and the processing may proceed to step S603 only when the zoom-in operation is instructed. Similarly, to modify the third exemplary embodiment in such a manner, for example, step S703 may be replaced with a step for determining presence or absence of the zoom-in operation, and the processing may proceed to step 704 only when the zoom-in operation is instructed. Depending on the lens, in a case where the zooming operation causes the object to go out of the depth of field during zooming irrespective of the zoom direction, the focal position is preferably moved irrespective of the zoom direction as illustrated in the flowcharts of FIGS. 4 to 6.

When the AF during zooming is performed, the zooming can be performed while searching an in-focus position although the focal position may be unstable during zooming. Accordingly, the AF during zooming is effective in a case where the zooming operation is performed without a relationship in which the field angle becomes narrow (zoom magnification is increased) as the object distance is increased. Thus, the lens control apparatus may include a first mode in which any of the flow processing of FIGS. 4 to 6 is performed, and a second mode in which the AF during zooming is performed. The target position of the focus lens in the mode in which the AF during zooming is performed is the in-focus position, and the target position of the focus lens in the mode in which the contrast AF method is performed is a lens position at which the AF evaluation value becomes the maximum value. The mode may be switched according to selection by the user. Alternatively, reliability of the focus detection may be acquired, and the mode may be automatically switched from the second mode to the first mode if the reliability is less than or equal to a threshold. The method for acquiring the reliability is not particularly limited, and for example, the reliability may be acquired from contrast or luminance acquired based on an image signal. Low reliability is acquired in a scene where the object not suitable for the AF during zooming is imaged, for example, a scene with low contrast or low luminance. In addition, the signal processing unit 7 may also function as a reliability acquisition unit, or another component may be added. In a case where an object with a high AF evaluation value is a main object and the main object is not located near a center, the control according to the present exemplary embodiment in which the mode is automatically switch from the second mode to the first mode is effective. In other words, the target position of the focus lens is acquired in the first mode in a case where a distance from a center of an imaging range to the main object is greater than a threshold value, and the target position is acquired in the second mode in a case where the distance is less than or equal to the threshold. Then, the focus lens is controlled to the acquired target position. Moreover, as described above, in a case where the focus adjustment is performed in the first mode in a case where the zooming is performed from the wide-angle side toward the telephoto side, and the focus adjustment is performed in the second mode in a case where the zooming is performed from the telephoto side toward the wide-angle side, switching between the first mode and the second mode is automatically performed according to the zoom direction.

In addition, in place of the mode in which the AF during zooming is performed, the lens control apparatus may also include, as the second mode, a mode in which the target position of the focus lens is acquired so as not to move the focal position, and the focus lens is controlled to the target position. The target position so as not to move the focal position refers to a position following the cam track for the same object distance even when the zoom lens is moved.

In the first to third exemplary embodiments, the focal position is changed to the direction corresponding to the zooming operation direction in the case where it is determined that the zooming operation has been instructed. Alternatively, the focal position may be changed to the direction corresponding to the zooming operation direction only in a case where the change of the zoom magnification by the zooming operation is greater than or equal to a predetermined value. The predetermined value may be a fixed value or a value at which it is determined that the object has moved out of the depth of field when it is assumed that the size of the object is kept constant by the zooming operation. The predetermined value may be set according to the imaging condition.

In the first to third exemplary embodiments, the focal length is moved in response to the zooming operation in both cases where the focus adjustment is performed by autofocusing and manual focusing. The manual focusing is often used in a case where the user wants to focus on a specific object. In this case, possibility that the user wants to image by magnifying the specific object is higher than in the case where the imaging is performed by autofocusing. Accordingly, when a manual focus mode is set, the focus lens may be moved so as not to move the focal position according to the change of the image plane position.

Although the exemplary embodiments of the present invention have been described above, the present invention is not limited to these exemplary embodiments, and various modifications and alternations may be made within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-211221, filed Oct. 31, 2017, which is hereby incorporated by reference herein in its entirety.

What is claimed is:

1. A lens control apparatus, comprising:
a control unit configured to control a position of a zoom lens and a position of a focus lens;
a storage unit configured to store a plurality of tracks indicating a relationship between the position of the zoom lens and the position of the focus lens when each of a plurality of object distances is in focus;
an object distance acquisition unit configured to acquire an object distance before movement of the zoom lens based on (a) a first track, (b) the position of the zoom lens and (c) the position of the focus lens before movement of the zoom lens;
a target position acquisition unit configured to acquire a target position of the focus lens after movement of the zoom lens based on (d) a second track and (e) the position of the zoom lens after movement of the zoom lens, the object distance corresponding to the second track being different from the object distance corresponding to the first track, wherein the target position acquisition unit is configured to acquire the target position of the focus lens in either of (1) a first mode in which the target position of the focus lens is acquired so as to move a focal position based on the movement of the zoom lens and (2) a second mode in which the target position of the focus lens is acquired based on a result of focus detection performed based on an image signal acquired by photoelectrically converting light entering through the imaging optical system including the zoom lens and the focus lens; and
a reliability acquisition unit configured to acquire a reliability of the focus detection,
wherein the target position acquisition unit is configured to acquire the target position of the focus lens in (1) the first mode in a case where the reliability is lower than or equal to a threshold and acquires the target position of the focus lens in (2) the second mode in a case where the reliability is higher than the threshold,
wherein the control unit is configured to control the position of the focus lens to the target position,
wherein the target position acquisition unit is configured to determine the second track by estimating the object distance after the movement of the zoom lens based on (i) the object distance before the movement of the zoom lens acquired by the object distance acquisition unit and (ii) a ratio of a focal length before and after the movement of the zoom lens.

2. The lens control apparatus according to claim 1, wherein the target position acquisition unit is configured to acquire the target position of the focus lens based on a change of an image plane position associated with the movement of the zoom lens and at least any of an object distance after the movement of the zoom lens estimated based on the movement of the position of the zoom lens and a change direction of the object distance caused by the movement of the zoom lens.

3. The lens control apparatus according to claim 1, wherein the object distance acquisition unit is configured to acquire the object distance before the movement of the zoom lens based on a result of focus detection performed based on an image signal acquired by photoelectrically converting light entering through the imaging optical system including the zoom lens and the focus lens, and wherein the target position acquisition unit is configured to acquire the target position of the focus lens based on the object distance before the movement of the zoom lens.

4. The lens control apparatus according to claim 3, wherein the object distance acquisition unit is configured to acquire the object distance before the movement of the zoom lens based on the position of the focus lens and the position of the zoom lens after the focal position is adjusted based on the result of the focus detection.

5. The lens control apparatus according to claim 1, wherein the target position acquisition unit is configured to acquire the target position of the focus lens based on a track acquired by combining the first track and the second track.

6. The lens control apparatus according to claim 1, wherein the target position acquisition unit is configured to change the second track according to at least any of information relating to a depth of field determined by the imaging optical system including the zoom lens and the focus lens, information relating to a moving speed of the zoom lens, and information relating to a moving amount of the zoom lens.

7. The lens control apparatus according to claim 1 further comprising a zooming operation instruction unit configured to instruct the movement of the zoom lens, wherein the target position acquisition unit is configured to acquire the target position of the focus lens so that a positional relationship between the zoom lens and the focus lens is coincident with a positional relationship on the second track at the target position of the zoom lens in a case where the target position of the zoom lens is instructed by the zooming operation instruction unit.

8. The lens control apparatus according to claim 1, wherein the target position acquisition unit is configured to acquire the target position so that a ratio of a moving amount of the zoom lens to a moving amount of the focal position associated with the movement of the zoom lens is less than or equal to a predetermined value.

9. The lens control apparatus according to claim 1, wherein the target position acquisition unit is configured to acquire the target position based on a moving amount of the zoom lens on by defining that a size of an object in an imaging signal is kept constant by the movement of the zoom lens.

10. The lens control apparatus according to claim 1, wherein the target position acquisition unit is configured to acquire the target position of the focus lens in any of a first mode in which the target position of the focus lens is acquired so as to move the focal position based on a change of the position of the zoom lens and a second mode in which the target position of the focus lens is acquired so as not to move the focal position based on the change of the position of the zoom lens.

11. The lens control apparatus according to claim 1, wherein the target position acquisition unit is configured to switch between the first mode and the second mode based on at least one of a position of a main object, reliability of the focus detection, and a moving direction of the zoom lens.

12. The lens control apparatus according to claim 1, further comprising an object detection unit configured to detect a main object based on the image signal, wherein the target position acquisition unit is configured to switch between the first mode and the second mode according to a position of the main object detected by the object detection unit.

13. The lens control apparatus according to claim 1, wherein the target position acquisition unit is configured to acquire the target position of the focus lens in the second mode in a case where the lens control apparatus adjusts the focal position in a manual focus mode.

14. The lens control apparatus according to claim 1, wherein the target position acquisition unit is configured to acquire the target position of the focus lens in the first mode in a case where zoom magnification of the imaging optical system is increased by the movement of the zoom lens and acquires the target position of the focus lens in the second mode in a case where the zoom magnification of the imaging optical system is decreased by the movement of the zoom lens.

15. An imaging apparatus, comprising:
the lens control apparatus according to claim 1; and
an imaging unit configured to photoelectrically convert light entered through an imaging optical system into an image signal and to output the image signal.

16. The imaging apparatus according to claim 15, further comprising a focus detection unit configured to perform focus detection based on the image signal, wherein the focus detection unit is configured to perform the focus detection based on contrast of the image signal.

17. A method for controlling an imaging optical system including a zoom lens and a focus lens, comprising:
acquiring an object distance before movement of the zoom lens based on (a) a first track, (b) a position of the zoom lens, and (c) a position of the focus lens; and
acquiring a target position of the focus lens after movement of the zoom lens based on (d) a second track and (e) a position of the zoom lens after movement of the zoom lens, the object distance corresponding to the second track being different from the object distance corresponding to the first track, the target position of the focus lens being acquired in any of (1) a first mode in which the target position of the focus lens is acquired so as to move the focal position based on the movement of the zoom lens and (2) a second mode in which the target position of the focus lens is acquired based on a result of focus detection performed based on an image signal acquired by photoelectrically converting light entering through the imaging optical system including the zoom lens and the focus lens;
acquiring a reliability of the focus detection; and
controlling the position of the focus lens to the target position,
wherein the target position of the focus lens is acquired in (1) the first mode in a case where the reliability is lower than or equal to a second threshold and acquired in (2) the second mode in a case where the reliability is higher than the second threshold,
wherein the second track is determined by estimating an object distance after the movement of the zoom lens based on (i) the object distance before the movement of the zoom lens, and (ii) a ratio of a focal length before and after the movement of the zoom lens.

* * * * *